UNITED STATES PATENT OFFICE.

LOUIS BENDA, OF MAINKUR, NEAR FRANKFORT-ON-THE-MAIN, GERMANY, ASSIGNOR TO LEOPOLD CASSELLA & CO. GESELLSCHAFT MIT BESCHRANKTER HAFTUNG, A CORPORATION OF GERMANY.

ACRIDINIUM COMPOUNDS AND A PROCESS OF MAKING THE SAME.

1,427,432. Specification of Letters Patent. Patented Aug. 29, 1922.

No Drawing. Application filed July 14, 1921. Serial No. 484,782.

*To all whom it may concern:*

Be it known that I, LOUIS BENDA, a subject of the Swiss Republic, residing at Mainkur, near Frankfort-on-the-Main, Germany, Bismarckstrasse 8, have invented new Acridinium Compounds and a Process of Making the Same (for which I have made application in Germany, January 19, 1918), of which the following is a full description.

It has been found that by the action of tannic acid in the presence of acid-binding agents, on the readily soluble salts of 3.6-diamino-10-alkylacridinium bases, insoluble and hitherto unknown compounds are obtained, which are of technical importance as fast pigments. As regards their adaptability for therapeutics they are exceptionally well suited as dusting powders for open wounds and especially for administration per os. Whilst the original materials, for instance the 3.6-diamino-10-methylacridiniumchloride, known under the name of Trypaflavine, are of an exceedingly bitter taste, which according to L. Benda (B 45,1798/1912) can still be perceived in a dilution of 1:40000, the new products are perfectly tasteless, they also do not dye the mucous membranes of the mouth and throat, as is the case with the compounds stated above. In the course of digestion they change by degrees into soluble bodies producing the desired effects.

*Example.*—5 kilos 3.6-diamino-10-methylacridiniumchloride (D. R. P. 243085) are dissolved in 200 liters water and mixed with a solution of 10 kilos tannic acid in 200 liters water and a 40 liters solution of acetate of soda, double normal.

An orange-yellow precipitate is formed at once, which is then filtered, washed with water, pressed and dried.

The new compound so obtained forms a bright orange-yellow coloured powder, absolutely tasteless, suitable for lake colours, which in cold water dissolves extremely difficultly, whereas in hot water and alcohol the solubility is somewhat better; by prolonged boiling with diluted hydrochloric acid, a clear orange coloured solution is obtained. In concentrated sulphuric acid the product dissolves nearly colourless. The solution is strongly green fluorescent.

If in the above example the 3.6-diamino-10-methylacridiniumchloride is substituted by homologues and analogues, compounds of similar properties are obtained.

Having now particularly described and ascertained the nature of my said invention and in what manner the same is to be performed, I declare, that what I claim is:

1. A process of preparing new sparingly soluble acridinium compounds, consisting in treating the readily soluble salts of 3.6-diamino-10-alkylacridinium-compounds with tannin in the presence of acid-binding agents.

2. As new substance the products obtained by treating the readily soluble salts of 3.6-diamino-10-alkylacridinium-compounds with tannin in the presence of acid-binding agents.

3. As new substance the product obtained by treating the readily soluble salts of 3.6-diamino-10-methylacridinium with tannin in the presence of acid-binding agents, forming a bright orange-yellow colored powder, absolutely tasteless, suitable for lake colors, which in cold water dissolves extremely difficultly, whereas in hot water and alcohol the solubility is somewhat better.

In witness whereof I have hereunto signed my name this sixteenth day of June, 1921, in the presence of two subscribing witnesses.

DR. LOUIS BENDA.

Witnesses:
 FRITZ STAAB,
 AUGUST SCHWALB.